United States Patent
Zhong et al.

(10) Patent No.: US 8,366,127 B2
(45) Date of Patent: Feb. 5, 2013

(54) INFANT CARRIER DEVICE SUITABLE FOR MULTI-ORIENTATION USE

(75) Inventors: Zhi-ren Zhong, Hong Kong (HK); Rui-bin Chen, Hong Kong (HK)

(73) Assignee: Wonderland Nurserygoods Hong Kong Company Limited, Hong Kong (HK)

( * ) Notice: Subject to any disclaimer, the term of this patent is extended or adjusted under 35 U.S.C. 154(b) by 666 days.

(21) Appl. No.: 12/603,689

(22) Filed: Oct. 22, 2009

(65) Prior Publication Data

US 2010/0102535 A1 Apr. 29, 2010

Related U.S. Application Data

(60) Provisional application No. 61/107,996, filed on Oct. 23, 2008.

(51) Int. Cl.
  *B62B 7/06* (2006.01)
(52) U.S. Cl. ...................................... 280/47.4; 280/642
(58) Field of Classification Search ................. 280/47.4, 280/642, 647, 650
See application file for complete search history.

(56) References Cited

U.S. PATENT DOCUMENTS

| 5,240,265 | A | * | 8/1993 | Huang | 280/47.4 |
| 5,257,799 | A | * | 11/1993 | Cone et al. | 280/642 |
| 5,490,685 | A | * | 2/1996 | Kitayama et al. | 280/47.38 |
| 5,547,256 | A | * | 8/1996 | D'Antuono et al. | 297/377 |
| 5,722,682 | A | * | 3/1998 | Wang | 280/642 |
| 5,752,738 | A | * | 5/1998 | Onishi et al. | 297/61 |
| 5,934,153 | A | * | 8/1999 | Yang | 74/551.3 |
| 6,036,221 | A | * | 3/2000 | Yang | 280/642 |
| 6,086,087 | A | * | 7/2000 | Yang | 280/658 |
| 6,530,591 | B2 | * | 3/2003 | Huang | 280/650 |
| 6,581,957 | B1 | * | 6/2003 | Lan | 280/642 |
| 6,851,700 | B2 | * | 2/2005 | Yoshie et al. | 280/642 |
| 7,070,197 | B2 | * | 7/2006 | Chen | 280/642 |
| 7,832,744 | B2 | * | 11/2010 | Chen et al. | 280/47.4 |
| 8,240,700 | B2 | * | 8/2012 | Greger et al. | 280/648 |

* cited by examiner

*Primary Examiner* — Jeffrey J Restifo
(74) *Attorney, Agent, or Firm* — Baker & McKenzie LLP (57) ABSTRACT

An infant carrier device comprises a foldable support frame, an adjustable backrest assembly, a backrest positioning mechanism including a fixed positioning member and a movable latching member connected with the backrest assembly, and a disengaging mechanism connected with the support frame and movable relative to the positioning member. The latching member is movable between a first position where the latching member is engaged with the positioning member for locking the backrest assembly in position, and a second position where the latching member is disengaged from the positioning member. Moreover, the disengaging mechanism is operable to interact with the latching member for causing the latching member to move from the first position to the second position when the support frame is folded.

20 Claims, 8 Drawing Sheets

INFANT CARRIER DEVICE SUITABLE FOR MULTI-ORIENTATION USE

CROSS-RELATED APPLICATION

This application claims priority of U.S. provisional application no. 61/107,996 filed on Oct. 23, 2008.

FIELD OF THE INVENTION

The present invention generally relates to infant carrier devices, and more particularly to an infant carrier device suitable for multi-orientation use.

DESCRIPTION OF THE RELATED ART

An infant stroller can be typically used for transporting an infant in a convenient manner. Because the adult pushes the infant stroller from the rear side, the adult usually cannot see the face of the child seated therein. This may be disadvantageous as the sight of a familiar face may comfort the child seated in the stroller.

To overcome the above issue, certain manufacturers have developed infant strollers that have a backrest adjustable toward the rear or front of the stroller for forward or rearward use orientation. More specifically, when the backrest is inclined forward, the child can be seated facing the rear of the stroller. When the backrest is inclined rearward, the child can be seated facing the front of the stroller. While this design of an adjustable backrest can offer multiple use orientation, it may render the operation of the stroller more complex. For example, when the stroller is to be collapsed for storage, the user has to turn the backrest to a predetermined position suitable for storage before folding the stroller. As a result, the operation of the stroller is adversely complicated.

Therefore, there is presently a need for an infant carrier device that can overcome the above drawbacks, and provide a more convenient operation.

SUMMARY

The present application describes an infant carrier device suitable for multi-orientation use that is convenient to operate and can be easily folded for storage.

In one embodiment, the infant carrier device comprises a foldable support frame, an adjustable backrest assembly, a backrest positioning mechanism including a fixed positioning member and a movable latching member connected with the backrest assembly, and a disengaging mechanism connected with the support frame and movable relative to the positioning member. The latching member is movable between a first position where the latching member is engaged with the positioning member for locking the backrest assembly in position, and a second position where the latching member is disengaged from the positioning member. Moreover, the disengaging mechanism is operable to interact with the latching member for causing the latching member to move from the first position to the second position when the support frame is folded.

At least one advantage of the infant carrier device described herein is the ability to disengage the backrest assembly from the backrest positioning mechanism without the need of manual intervention, when the infant carrier device is folded for storage. Accordingly, the operation of the infant carrier device can be advantageously facilitated.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENTS

The present application describes an infant carrier device suitable for multi-orientation use that is convenient to operate and can be easily folded for storage.

Figure 1:
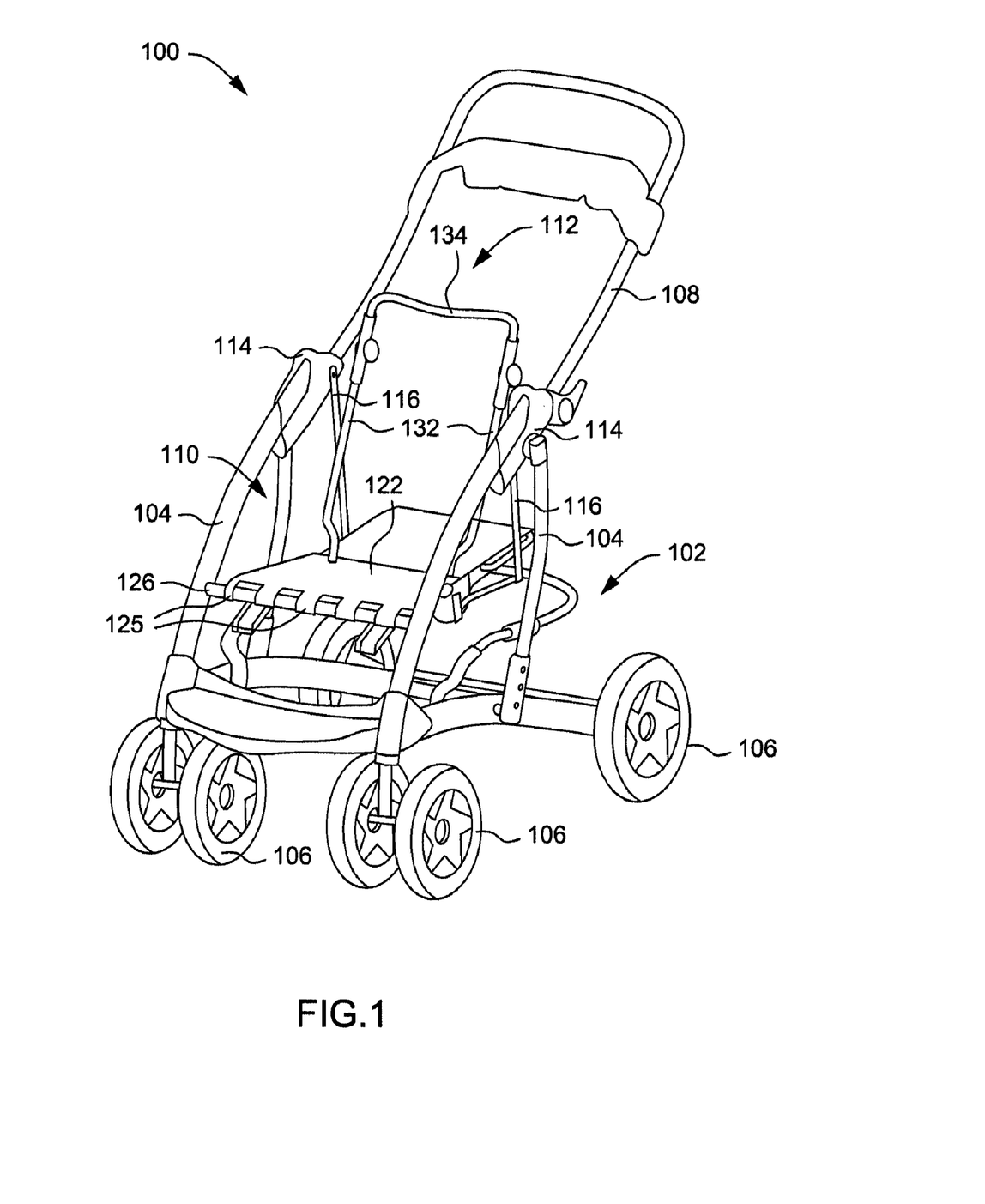
FIG. 1 is a schematic view illustrating an infant carrier device suitable for multi-orientation use according to one embodiment of the present invention.

FIG. 1 is a schematic view illustrating one embodiment of an infant carrier device 100 that is suitable for multi-orientation use. The infant carrier device 100 can exemplary be a stroller device. As shown in FIG. 1, the infant carrier device 100 has a foldable support frame 102. The support frame 102 can include a plurality of support tubes 104, a plurality of wheels 106, a push rod 108, a seat assembly 110 having a seat board 122, and a backrest assembly 112. In one embodiment, each support tube 104 can be made of a single tube or a plurality of telescopic tube sections assembled one another. The support tubes 104 may be connected with the push rod 108 via two hinges 114 for forming the foldable support frame 102. Each of the left and right side of the seat assembly 110 is respectively coupled with one hinge 114 of the support frame 102 via a hanging bar 116 that can hold the seat assembly 110 at a location below the hinge 114. Each hinge 114 may include a latch mechanism (not shown) that can either lock the support tube 104 with the push rod 108, or unlock the connection between the support tube 104 and the push rod 108. In particular, the latch mechanism can be coupled with a button provided on a distal end of the push rod 108 via a cable or the like (not shown). After a user operates the button for unlocking the latch mechanism, the support tubes 104 can rotate relative to the push rod 108 for folding the support frame 102. Consequently, the hanging bars 116 can be driven in rotation relative to the hinges 114 as the seat assembly 110 and the backrest assembly 112 are collapsed for storage.

Figure 2:
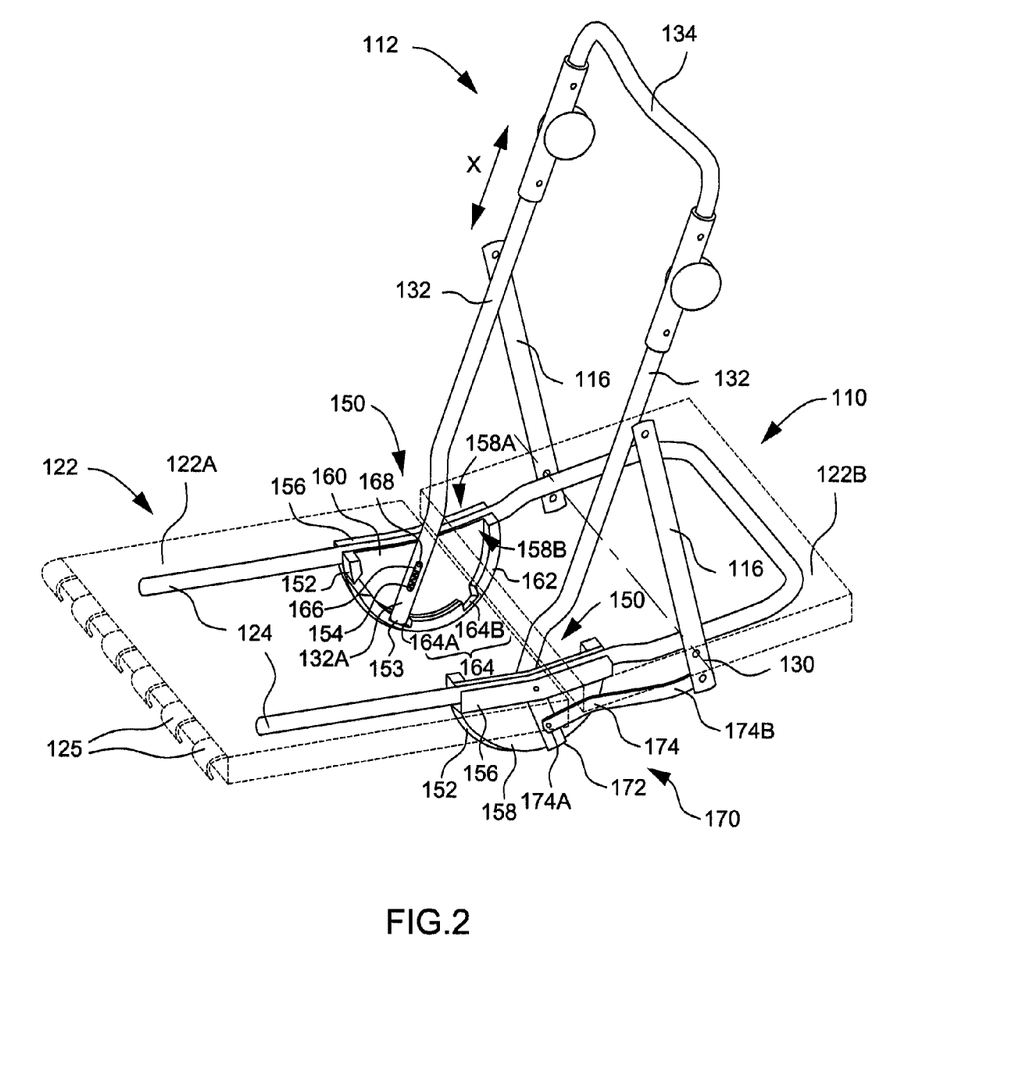
FIG. 2 is a perspective view illustrating a seat assembly and backrest assembly of the infant carrier device shown in FIG. 1.

FIG. 2 is a perspective view illustrating the seat assembly 110 and the backrest assembly 112. As shown in FIGS. 1 and 2, the seat assembly 110 includes the seat board 122, and a seat tube portion 124 affixed on a bottom of the seat board 122. In one embodiment, the seat board 122 may include a front seat portion 122A and a rear seat portion 122B. A front edge of the front seat portion 122A can include a plurality of fastening devices 125 through which the front end of the seat board 122 can be affixed with a cross bar 126 of the support frame 102 (FIG. 1). Each of a left and right edge of the rear seat portion 122B can be respectively coupled with one of the hanging bars 116 via a pivot link 130, which can be formed by a rivet or like hinge element.

The backrest assembly 112 can include two parallel backrest tube portions 132 and an adjusting tube 134 slidably or pivotally connected with top ends of the backrest tube portions 132 for forming a U-shaped backrest assembly 112. A bottom end of each backrest tube portion 132 is assembled with a backrest positioning mechanism 150 operable for adjusting the inclination of the backrest assembly 112.

As shown in FIG. 2, each backrest positioning mechanism 150 includes a positioning member 152, a latching member 153 mounted on the backrest tube portion 132, and a spring element 154. According to one embodiment, the positioning member 152 can be formed in a single piece. The positioning member 152 can define a channel 156 used for receiving and fixing the seat tube portion 124, and a plate 158 that extends approximately vertically at one side of the channel 156. More specifically, the channel 156 is located at one side 158A of the plate 158, whereas another side 158B of the plate 158 opposite the channel 156 has an inwardly recessed surface 160. A bottom border of the recessed surface 160 forms an abutting flange 162. At least one portion of the abutting flange 162 can have a circular shape in which are formed a plurality of positioning grooves 164 disposed at different radial angles. Each of the positioning grooves 164 can have a shape adapted to receive the latching member 153 provided on the backrest tube portion 132 for securely holding the backrest tube portion 132 at a different angle of inclination. In one embodiment, the latching member 153 may be formed as a distal end of the backrest tube portion 132, and the positioning grooves 164 can include a forward positioning groove 164A and a rearward positioning groove 164B. "Forward" positioning groove 164A herein designates a groove that can be engaged by the latching member 153 for positioning the backrest assembly 112 inclined rearward such that the child can be seated facing forward. "Rearward" positioning groove 164B designates a groove that can be engaged for positioning the backrest assembly 112 inclined forward such that the child can be seated facing rearward. The recessed surface 160 and the abutting flange 162 can partially define an accommodating space in which a bottom end 132A of the backrest tube portion 132 can be lodged.

As shown in FIG. 2, the bottom end 132A of the backrest tube portion 132 can have an elongated slot 166. A rivet element 168 can be passed through the elongated slot 166 and a hole (not shown) formed through the recessed surface 160 for mounting the backrest tube portion 132 on the positioning member 152. The backrest tube portion 132 can thereby rotate around a pivot axis defined by the rivet element 168 for adjusting the inclination of the backrest relative to the positioning member 152. Furthermore, because the rivet element 168 is mounted in sliding relationship through the elongated slot 166, the backrest tube portion 132 can also slide along its longitudinal direction X for either moving the latching member 153 away from any of the positioning grooves 164, or causing the latching member 153 to engage with one of the positioning grooves 164 by resilient action of the spring element 154.

When the infant carrier device 100 is folded for storage, the latching member 153 can also be moved away from the positioning groove 164 by action of a disengaging mechanism 170, whereby allowing the backrest tube portion 132 to tilt freely according to the exerted force. In this embodiment, the disengaging mechanism 170 can include a pushing member 172, and a connecting link 174 assembled between the pushing member 172 and one the hanging bar 116.

Figure 3:
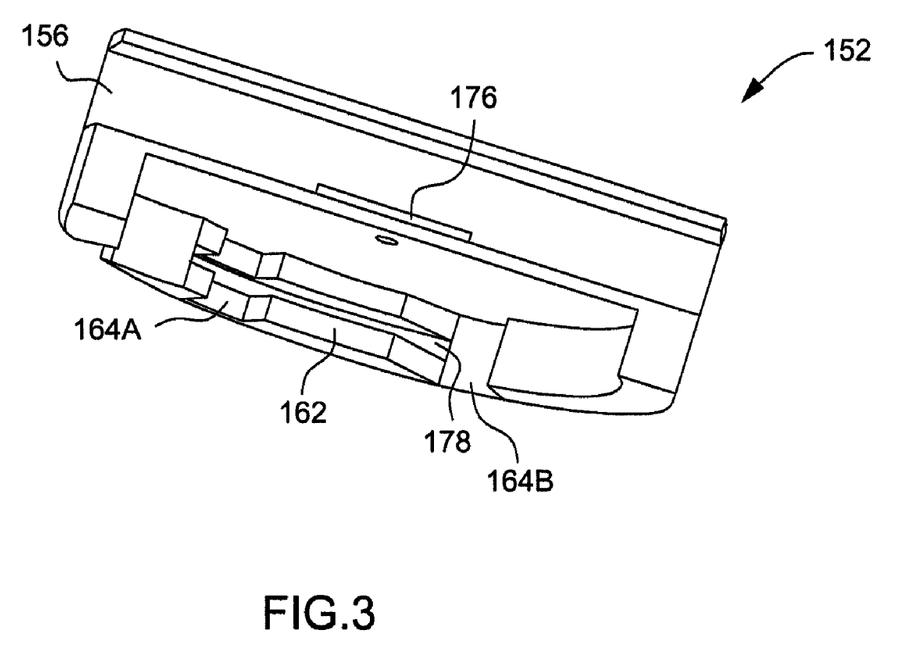
FIG. 3 is a schematic view of a positioning member used in a backrest positioning mechanism according to one embodiment of the present invention.
Figure 4:
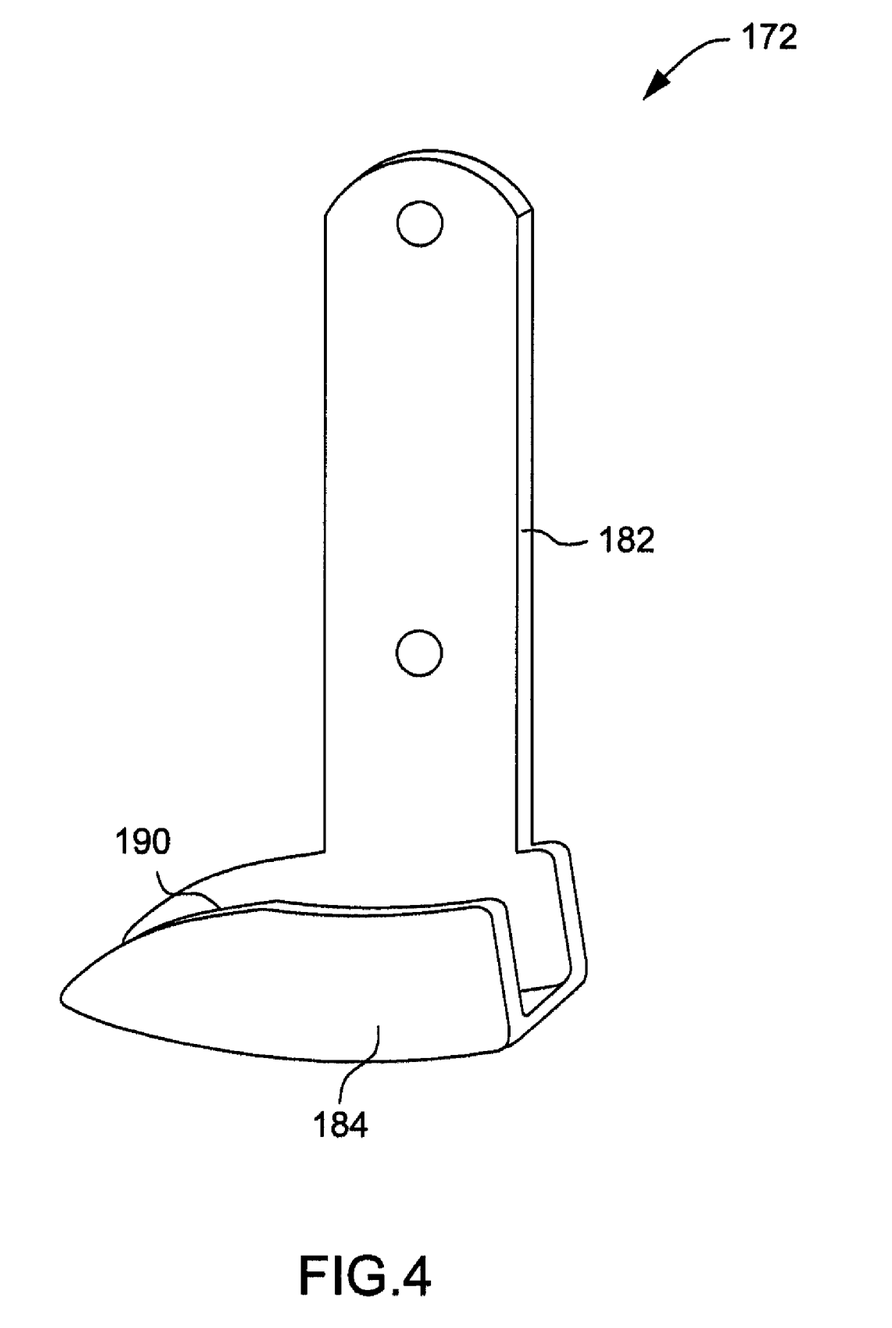
FIG. 4 is a schematic view of a pushing member used in a disengaging mechanism according to one embodiment of the present invention.

FIG. 3 is a schematic view of the positioning member 152, and FIG. 4 is a schematic view of the pushing member 172 adapted to be mounted with the positioning member 152 shown in FIG. 2. As shown in FIG. 3, the positioning member 152 includes an opening 176 formed through a bottom of the channel 156. In addition, another opening 178 is also formed through the abutting flange 162, the opening 178 communicating with one of the positioning grooves 164. For example, the opening 178 may be in communication with at least the forward positioning groove 164A. The pushing member 172 is assembled with the positioning member 152 through the openings 176 and 178.

Figure 5:
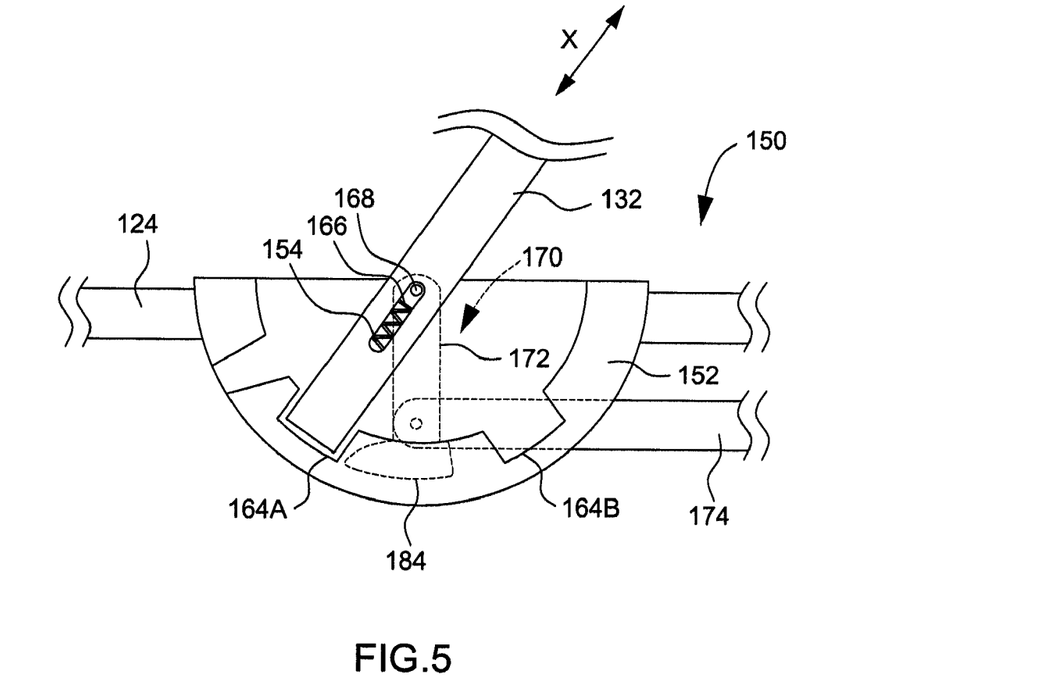
FIGS. 5 and 6 are schematic views illustrating the operation of the disengaging mechanism shown FIG. 4 according to one embodiment of the present invention.

As shown in FIG. 4, the pushing member 172 may have a J-shape including a stem portion 182 and a curved foot portion 184. A top end of the stem portion 182 can be mounted through the opening 176, and pivotally assembled with the positioning member 152 via the rivet element 168 (FIG. 5). The foot portion 184, having an abutting surface 190 at a tip thereof, has a shape that wraps around an outer side of the abutting flange 162 and passes through the opening 178. Moreover, as shown in FIG. 2, the pushing member 172 is also connected with one of the hanging bars 116 via the connecting link 174. According to one embodiment, the connecting link 174 can be a connecting bar having a first end 174A pivotally connected with the stem portion 182, and a second end 174B pivotally connected with the hanging bar 116.

Figure 6:
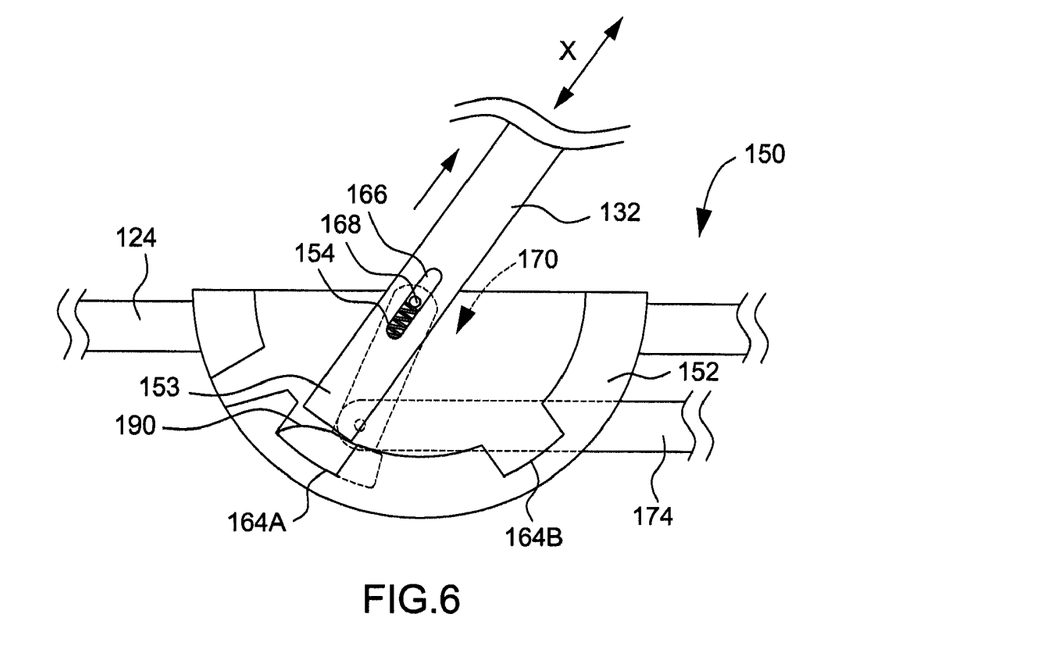

FIGS. 5 and 6 are schematic views illustrating how the disengaging mechanism 170 operates according to one embodiment of the present invention. In particular, FIG. 5 illustrates the backrest tube portion 132 securely held by the positioning member 152 in a forward position, when the infant carrier device 100 is unfolded. FIG. 6 illustrates the backrest tube portion 132 disengaged from the positioning member 152, when the infant carrier device 100 is being folded. First referring to FIG. 5, the latching member 153 of the backrest tube portion 132 is shown as being engaged with the forward positioning groove 164A by action of the spring element 154, whereas the foot portion 184 of the pushing member 172 is located in the opening 178 between the forward positioning groove 164A and the rearward positioning groove 164B. In this position, the abutting surface 190 of the foot portion 184 is not in contact with the latching member 153 of the backrest tube portion 132.

Referring to FIGS. 1, 2, and 6, when the infant carrier device 100 is folded, the hanging bar 116 moves forward with the connecting link 174. Pushed in movement by the connecting link 174, the pushing member 172 consequently rotates around the pivot axis defined by the rivet element 168, which causes the foot portion 184 to move through the opening 178 toward the forward positioning groove 164A. Consequently, the abutting surface 190 of the foot portion 184 can push on the latching member 153 and overcome the elastic force of the spring element 154. The latching member 153 can thereby move away from the forward positioning groove 164A, as shown in FIG. 6. After the latching member 153 disengages from the forward positioning groove 164A, the backrest tube portion 132 can be unlocked and tilt freely in accordance with the direction of the exerted force for folding the infant carrier device 100. Manual operation for disengaging the latching member 153 is thus not necessary for folding the backrest tube portion 132.

With the disengaging mechanism, the backrest tube portion can therefore disengage itself from the backrest positioning mechanism when the infant carrier device is folded by the user, without the need of additional effort. As a result, the manual operation for collapsing the infant carrier device 100 can be facilitated. While the aforementioned embodiment describes a specific example of the disengaging mechanism, other embodiments may also be possible according to the design of the seat assembly as described hereafter.

Figure 7:
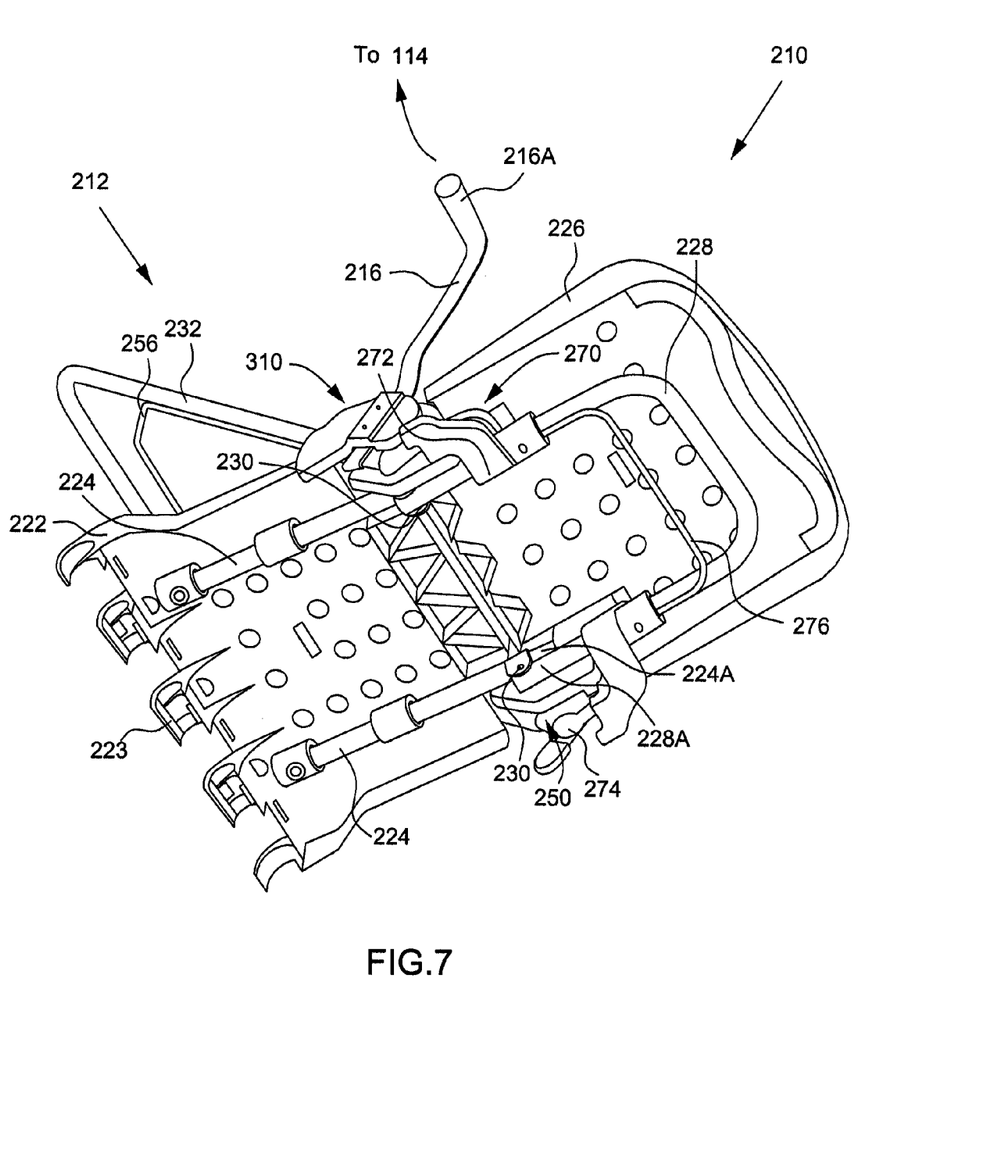
FIG. 7 is a perspective view illustrating a seat assembly and backrest assembly suitable for use in an infant carrier device, according to another embodiment of the present invention.

FIG. 7 is a perspective view illustrating the construction of another seat assembly 210 and backrest assembly 212 that may be used in an infant carrier device. As shown in FIG. 7, the seat assembly 210 includes a front seat portion 222, a front seat tube portion 224 fixed at the bottom of the front seat portion 222, a rear seat portion 226, and a rear seat tube portion 228 fixed at a bottom of the rear seat portion 226. The front seat portion 222 may have a slightly inclined surface for providing a comfortable seating position. A front edge of the front seat portion 222 may also include fastening elements 223 that can catch the cross bar 126 of the support frame 102 (FIG. 1) for affixing the front edge of the seat assembly 210 on the support frame 102. In the illustrated embodiment, the rear seat tube portion 228 can provide support for the rear seat portion 226 and rotate around a pivot axle 230 for adjusting the inclination of the rear seat portion 226. The backrest assembly 212 can include a backrest tube portion 232 adapted to provide support for a backrest board or a cloth material (not shown). Each of a left and right side of the backrest tube portion 232 can respectively connect with the pivot axle 230, and be mounted with a backrest positioning mechanism 250 for adjusting the inclination of the backrest assembly 212. Moreover, a seat affixing mechanism 270 can be provided between the front seat tube portion 224 and the rear seat tube portion 228. The seat affixing mechanism 270 can be operable to detachably affix the back seat tube portion 228 with the front seat tube portion 224. In addition, each of a left and right side of the seat assembly 210 can also respectively connect with one hanging bar 216. Each of the hanging bars 216 can also rotate around the axis of the pivot axle 230, a top end 216A of each hanging bar 216 being also connected with the hinge 214 as previously described (FIG. 1). Furthermore, each hanging bar 216 is mounted with a disengaging mechanism 310 that can interact with the backrest positioning mechanism 250 for facilitating collapsing of the backrest assembly 212 when the infant carrier device is folded for storage.

Figure 8:
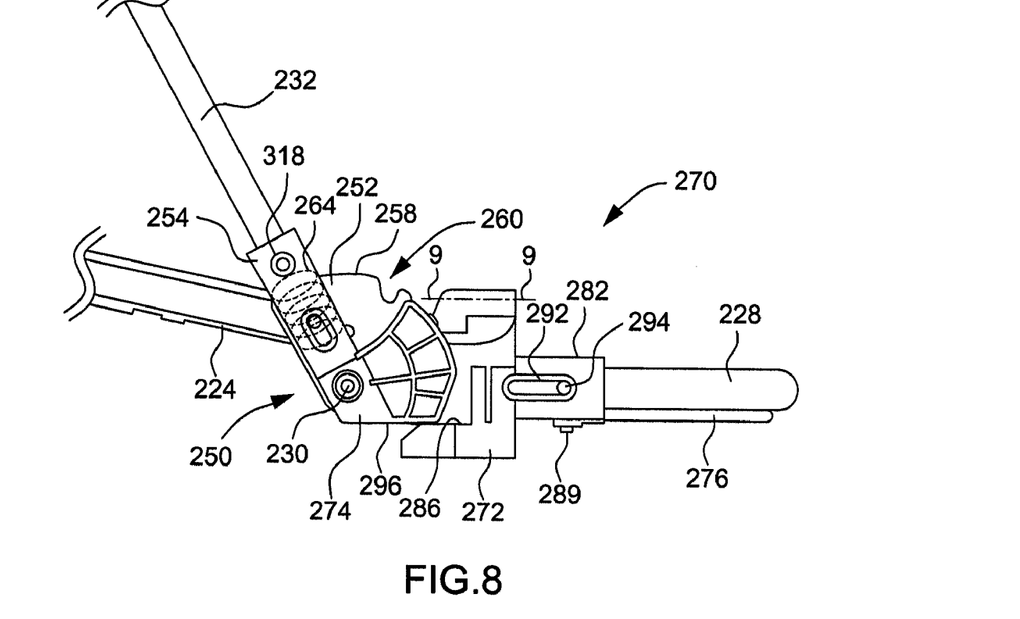
FIGS. 8 and 9 are schematic views illustrating the backrest positioning mechanism and seat affixing mechanism shown in FIG. 7.
Figure 9:
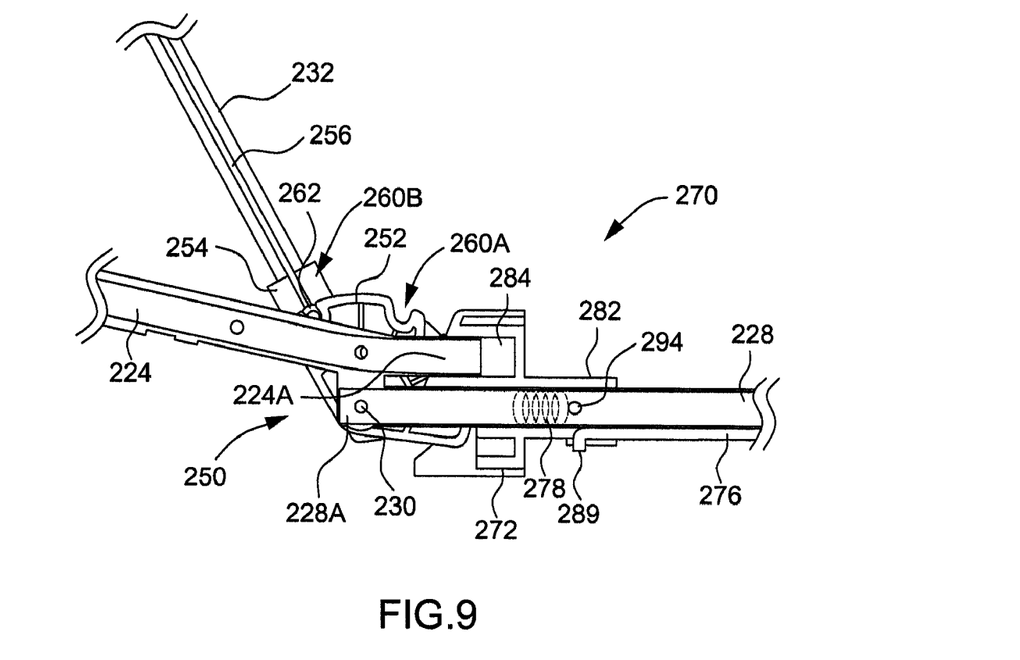

FIGS. 8 and 9 are schematic side views illustrating the backrest positioning mechanism 250 and seat affixing mechanism 270, wherein FIG. 9 is a partial of cross-sectional view taken along section line 9-9 shown in FIG. 8. For the sake of clarity, the hanging bar 216, the front seat portion 222, and the rear seat portion 226 are not represented in FIG. 8 and FIG. 9. As shown in FIGS. 8 and 9, the backrest positioning mechanism 250 includes a positioning member 252, a latching member 254, and a cable 256 connected with the latching member 254. The positioning member 252 can have a generally planar shape with a top edge 258 forming at least partially a circular shape. The positioning member 252 also includes a plurality of positioning grooves 260 arranged at different radial angles. The positioning grooves 260 can include a forward positioning groove 260A and a rearward positioning groove 260B. "Forward" positioning groove 260A herein designates a groove that can be engaged for positioning the backrest assembly 212 inclined rearward such that the child can be seated facing forward. "Rearward" positioning groove 260B designates a groove that can be engaged for positioning the backrest assembly 212 inclined forward such that the child can be seated facing rearward. The latching member 254 may have a cylindrical shape, and can be mounted on a bottom end of the backrest tube portion 232 at an outer side of the positioning member 252. A side of the latching member 254 facing the positioning member 252 can have a protruding portion 262, and a spring element 264 can be mounted in the latching member 254. By action of the spring element 264, the protruding portion 262 of the latching member 254 can be urged to either lie adjacent to the top edge 258 of the positioning member 252, or insert into a positioning groove 260 corresponding to an inclination of the backrest tube portion 232. When a user operates to pull on the cable 256, the exerted force can overcome the resilient force from the spring element 264, and move the protruding portion 262 of the latching member 254 away from the positioning groove 260. After the protruding portion 262 has disengaged from the positioning groove 260, the user can rotate the unlocked backrest tube portion 232 around the pivot axle 230 for adjusting the inclination of the backrest tube portion 232 (as shown in FIG. 7). When the backrest tube portion 232 (and backrest assembly) reaches a desired angle of inclination, the protruding portion 262 can engage again with another positioning groove 260 by action of the spring element 264 for locking the backrest tube portion 232 in position.

As shown in FIGS. 8 and 9, the seat affixing mechanism 270 can include a rear seat locking member 272, an interference member 274, a pull bar 276, and a spring element 278. In one embodiment, the rear seat locking member 272 and the interference member 274 can be made of plastic, metal, or a combination of like materials. Further, the interference member 274 can be fixed on a distal end of the backrest tube portion 232 in proximity of the latching member 254.

The rear seat locking member 272 can include a first sleeve 282, a second sleeve 284, and an abutting surface 286. In one embodiment, the first sleeve 282 is located at a height that differs from the second sleeve 284, the lower first sleeve 282 being mounted on the back seat tube portion 228 in a sliding relationship, and the second sleeve 284 being located higher facing the front seat tube portion 224. The spring element 278 is mounted in the first sleeve 282. One end of the spring element 278 is fixed with the rear seat tube portion 228, and a second end of the spring element 278 is connected with the rear seat locking member 272. By action of the spring element 278, the rear seat locking member 272 can be urged toward the front seat tube portion 224 such that the second sleeve 284 engages with a rear end 224A of the front seat tube portion 224 for affixing together the front seat tube portion 224 and the rear seat tube portion 228. The pull bar 276 is mounted along a lower inner surface of the first sleeve 282, and includes a curved end 289 that is secured through a hole of the first sleeve 282 for securely joining the pull bar 276 with the rear seat locking member 272. A side surface of the first sleeve 282 can include a slot 292 through which a protrusion 294 formed on the rear seat tube portion 228 may be mounted. The slot 292 can delimit the course of the rear seat locking member 272 on the rear seat tube portion 228, and block relative rotation between the rear seat locking member 272 and the rear seat tube portion 228.

FIGS. 8 and 9 show the seat assembly 210 and backrest assembly 212 in a rearward use state in which a child can be seated facing rearward. As shown in FIGS. 8 and 9, by action of the spring element 278, the rear seat locking member 272 can be urged toward the front seat tube portion 224, such that the second sleeve 284 can engage with the rear end 224A of the front seat tube portion 224 for affixing the front seat tube portion 224 with the rear seat tube portion 228. The rear seat tube portion 228 hence affixed can support the rear seat portion 226 in an approximately horizontal position. (FIG. 7). Moreover, the latching member 254 of the backrest tube portion 232 is engaged in the rearward positioning groove 260B for locking the backrest tube portion 232 in position, which is inclined relative to the rear seat tube portion 228 at an angle greater than an angle between the backrest tube portion 232 and the front seat tube portion 24. In the rearward use configuration, a bottom edge 296 of the interference member 274 also contacts with the abutting surface 286 of the rear seat locking member 272 for blocking rotation of the backrest tube portion 232 around the pivot axle 230. Accordingly, even if the latching member 254 disengages from the rearward positioning groove 260B, the backrest tube portion 322 still cannot rotate around the pivot axle 230, and blocking adjustment of the backrest tube portion 232.

Figure 10:
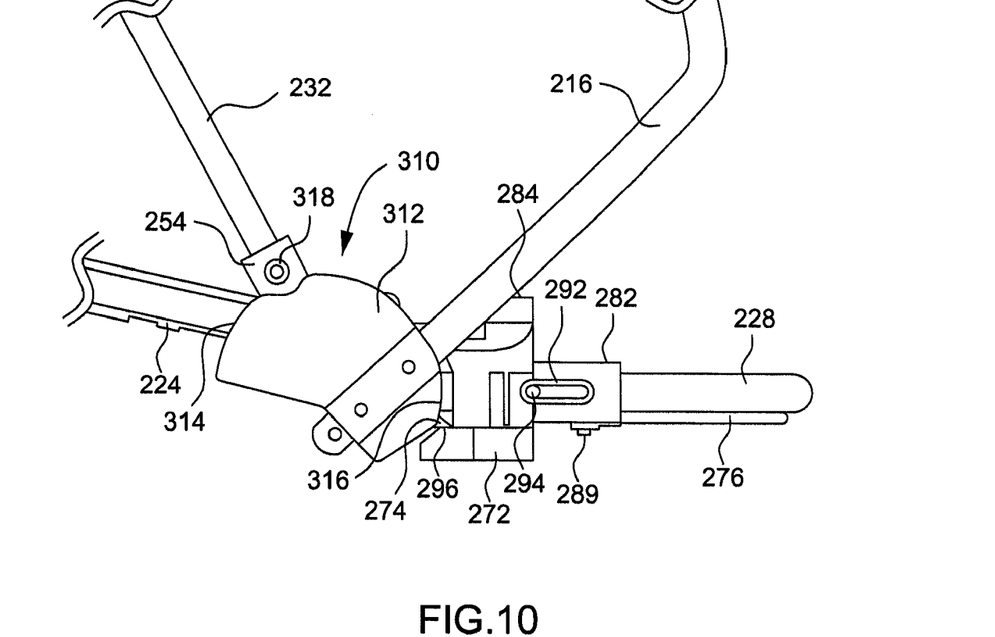
FIGS. 10 and 11 are schematic views illustrating the operation of a disengaging mechanism, according to another embodiment of the present invention.
Figure 11:
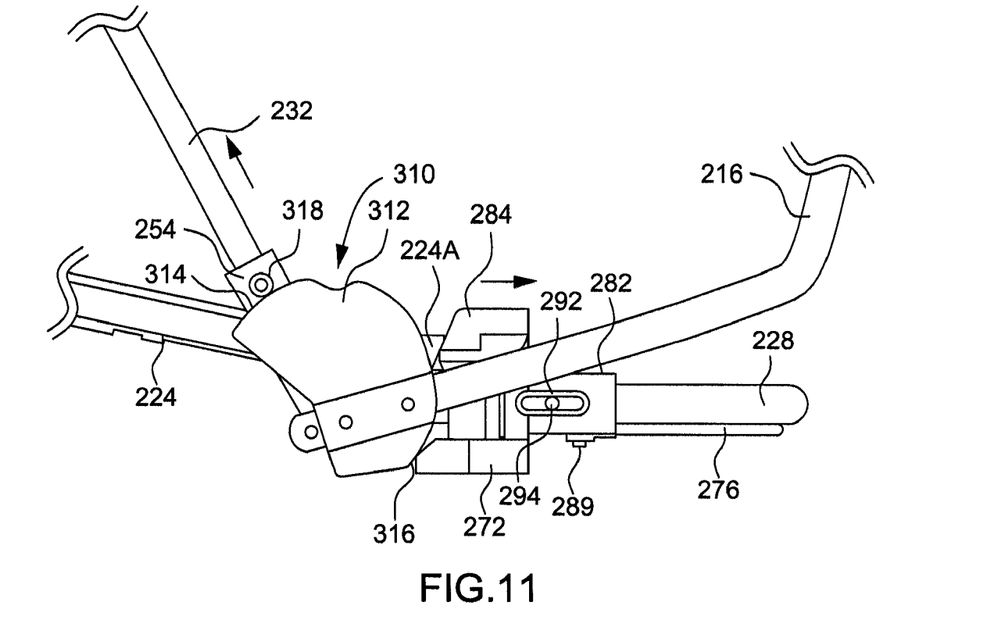

FIGS. 10 and 11 are schematic views illustrating the use of a disengaging mechanism 310 for facilitating the folding of an infant carrier device provided with seat and backrest assemblies as shown in FIG. 7. The disengaging mechanism 310 includes a pushing member 312. In this embodiment, the pushing member 312 can have a planar shape, and is affixed on the hanging bar 216 at an outer side of the latching member 254. In other words, the latching member 254 is located between the positioning member 252 and the pushing member 312. A peripheral edge of the pushing member 312 include a first surface 314 and a second surface 316. When the hanging bar 216 brings the pushing member 312 in rotation by pivoting around the pivot axle 230, the first surface 314 can come in abutment against a protruding portion 318 that is provided on a side of the latching member 254 opposite the positioning member 252, whereas the second surface 316 can come in abutment against the rear seat locking member 272.

FIG. 10 shows the seat assembly 210 and backrest assembly 212 in a rearward use configuration before the infant carrier device is unfolded. In this rearward use configuration, the first surface 314 and the second surface 316 of the pushing member 312 respectively do not abut against the protruding portion 318 of the latching member 254 and the rear seat locking member 272. Accordingly, the backrest positioning mechanism 250 and the seat affixing mechanism 270 can be respectively kept in the configuration shown in FIGS. 8 and 9.

As shown in FIG. 11, when the infant carrier device is folded, the hanging bar 216 rotates along with the pushing member 312. In particular, as the pushing member 312 rotates, the first surface 314 come in abutment against the protruding portion 318 of the latching member 254, which is pushed toward the top of the backrest tube portion 232 for disengaging the protruding portion 262 provided on the other side of the latching member 254 (FIG. 9) from the backward positioning groove 260B. Moreover, the second surface 316 of the pushing member 312 also comes in abutment against the rear seat locking member 272, which is also pushed toward the rear of the rear seat tube portion 228 for disengaging the abutting surface 286 and the second sleeve 284 from the bottom edge 296 of the interference member 274 and the rear end 224A of the front seat tube portion 224, respectively. Because the backrest tube portion 232 no longer engages with the positioning member 252 and the rear seat locking member 272, the backrest tube portion 232 can be unlocked and freely tilt along with the folding of the infant carrier device.

It is worth noting that the above mechanism and related advantages can also be obtained when the backrest assembly 212 is initially in a forward use configuration (i.e., locked in the forward positioning groove 260A), before the infant carrier device is folded. In this case, when the user folds the infant carrier device, the hanging bar 216 and pushing member 312 will rotate in a same manner, bringing the first surface 314 in abutment against the protruding portion 318 of the latching member 254. Consequently, the latching member 254 is pushed toward the top end of the backrest tube portion 232 for disengaging the protruding portion 262 (FIG. 9) of the engaging member 254 from the positioning member 252. The backrest assembly 212 can then freely tilt in cooperation with the folding of the infant carrier device for convenient storage, without the need of additional effort from the user.

It can be noted that the distance between the first surface 314 and the pivot axle 230 is greater than the distance between the second surface 316 and the pivot axle 230. When the backrest assembly 12 is in the forward use configuration and the latching member 254 is engaged with the positioning member 252, contact between the protruding portion 262 and the second surface 316 can be thereby prevented.

At least one advantage of the infant carrier device described herein is the ability to disengage the backrest assembly from the backrest positioning mechanism without the need of manual intervention, when the infant carrier device is folded for storage. Accordingly, the operation of the infant carrier device can be advantageously facilitated.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A infant carrier device suitable for multi-orientation use, comprising:
   a foldable support frame;
   a seat assembly coupled with the support frame;
   a backrest assembly including a backrest tube portion operable to rotate about a pivot axle relative to the seat assembly;
   a backrest positioning mechanism, including a positioning member provided on the seat assembly and a latching member provided on the backrest tube portion, wherein the latching member is movable between a first position where the latching member is engaged with the positioning member for locking the backrest assembly at a given inclination angle, and a second position where the latching member is disengaged from the positioning member; and
   a disengaging mechanism, including a pushing member that is connected with the support frame and movable relative to the positioning member;
   wherein the pushing member is movable to come in abutment against the latching member for causing the latching member to move from the first position to the second position, when the support frame is folded.

2. The infant carrier device according to claim 1, wherein the latching member is kept in the first position by action of a spring element.

3. The infant carrier device according to claim 1, wherein the positioning member includes a plurality of positioning grooves that associated with a plurality of inclination angles of the backrest assembly, the latching member being engaged with a given one of the positioning grooves for locking the backrest assembly at a desired inclination angle.

4. The infant carrier device according to claim 3, wherein the latching member is formed by an end portion of the backrest tube portion adapted to engage into any of the positioning grooves.

5. The infant carrier device according to claim 4, wherein a folding operation applied on the support frame causes the pushing member to travel through the given positioning groove and come in abutment against the latching member for disengaging the latching member from the given positioning groove.

6. The infant carrier device according to claim 3, wherein the latching member is movably mounted on the backrest tube portion, the latching member being movable relative to the backrest tube portion for disengaging from or engaging with the given positioning groove.

7. The infant carrier device according to claim 6, wherein the pushing member is operable to rotate about the pivot axle of the backrest tube portion relative to the seat assembly to come in abutment against the latching member for causing the latching member to move from the first position to the second position.

8. The infant carrier device according to claim 1, wherein the support frame is connected with the seat assembly via a hanging bar that is movable to cause the pushing member to come in abutment against the latching member when the support frame is folded for storage.

9. The infant carrier device according to claim 8, wherein the hanging bar is pivotally connected on a side of the seat assembly.

10. The infant carrier device according to claim 1, wherein the seat assembly comprises a front seat portion, a front seat tube portion affixed with the front seat portion, a rear seat portion, and a rear seat tube portion affixed with the rear seat portion, wherein the rear seat portion is operable to rotate relative to the front seat portion.

11. The infant carrier device according to claim 10, further comprising a seat affixing mechanism, wherein the seat affixing mechanism includes a rear seat locking member slidably mounted on the rear seat portion, the rear seat locking member being movable to detachably engage with the front seat tube portion for affixing the rear seat portion with the front seat portion.

12. The infant carrier device according to claim 11, wherein the rear seat locking member is engaged with the front seat tube portion by action of a spring element.

13. The infant carrier device according to claim 12, wherein a folding operation on the support frame further causes the pushing member to come in abutment against the rear seat locking member for disengaging the rear seat locking member from the front seat tube portion.

14. The infant carrier device according to claim 13, wherein the seat affixing mechanism further comprises an interference member mounted on the backrest tube portion, the interference member being in contact with the rear seat locking member for blocking rotation of the backrest tube portion when the rear seat locking member is engaged with the front seat tube portion.

15. The infant carrier device according to claim 14, wherein the folding operation of the support frame further causes the pushing member to come in abutment against the rear seat locking member for disengaging the rear seat locking member from the contact with the interference member.

16. An infant carrier device comprising:
a foldable support frame;
an adjustable backrest assembly;
a backrest positioning mechanism including a fixed positioning member and a movable latching member connected with the backrest assembly, wherein the latching member is movable between a first position where the latching member is engaged with the positioning member for locking the backrest assembly in position, and a second position where the latching member is disengaged from the positioning member; and
a disengaging mechanism connected with the support frame and movable relative to the positioning member; wherein the disengaging mechanism is operable to interact with the latching member for causing the latching member to move from the first position to the second position when the support frame is folded.

17. The infant carrier device according to claim 16, wherein the positioning member includes a plurality of positioning grooves, the latching member in the first position being engaged with a given one of the positioning grooves.

18. The infant carrier device according to claim 17, wherein the disengaging mechanism comprises a pushing member movable to come in abutment against the latching member for causing the latching member to disengage from the given positioning groove.

19. The infant carrier device according to claim 18, further comprising a seat assembly pivotally connected with the support frame via a hanging bar.

20. The infant carrier device according to claim 19, wherein the pushing element is driven in movement by the hanging bar when the support frame is folded.

* * * * *

UNITED STATES PATENT AND TRADEMARK OFFICE
CERTIFICATE OF CORRECTION

| | |
|---|---|
| PATENT NO. | : 8,366,127 B2 |
| APPLICATION NO. | : 12/603689 |
| DATED | : February 5, 2013 |
| INVENTOR(S) | : Zhi-Ren Zhong and Rui-bin Chen |

It is certified that error appears in the above-identified patent and that said Letters Patent is hereby corrected as shown below:

Title Page, item (73) the name of the Assignee should be: "Wonderland Nurserygoods Company Limited"

Signed and Sealed this
Twenty-first Day of June, 2016

Michelle K. Lee
*Director of the United States Patent and Trademark Office*